Jan. 8, 1952     A. G. RICHARDSON ET AL     2,581,444
DIRECTION FINDER
Filed Sept. 28, 1949                                                2 SHEETS—SHEET 2
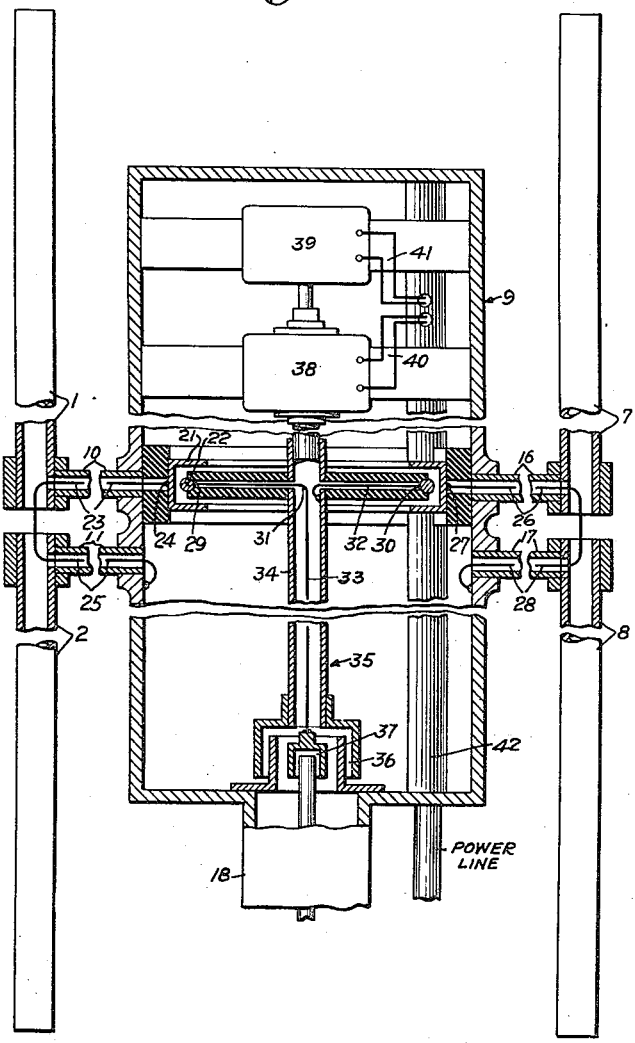
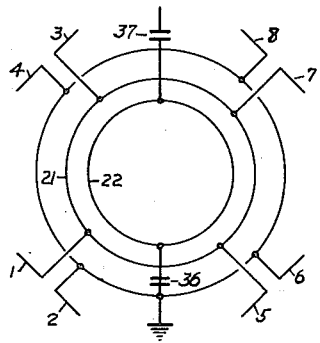
INVENTORS
AVERY G. RICHARDSON
FRANK O. CHESUS
BY
ATTORNEY Patented Jan. 8, 1952

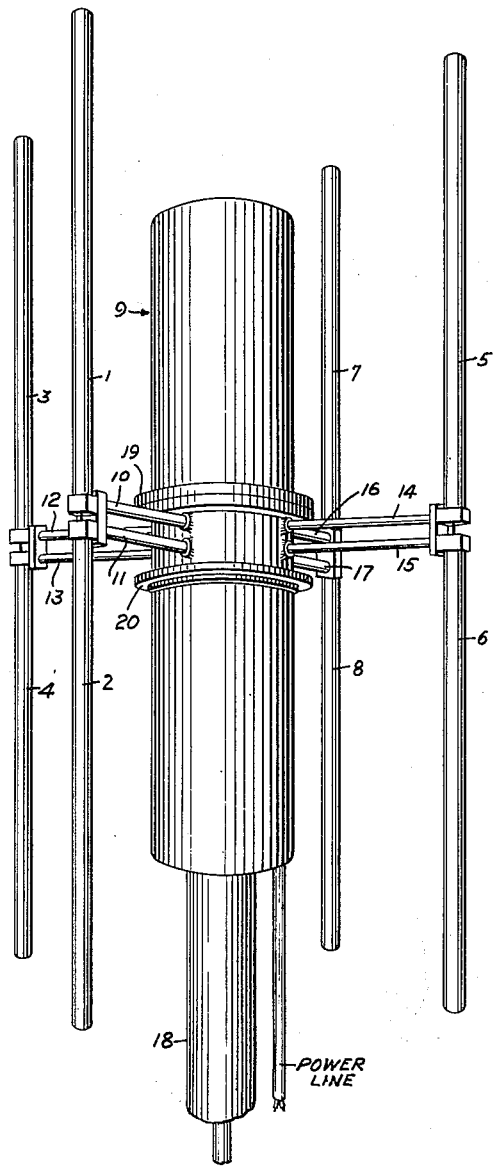

2,581,444

UNITED STATES PATENT OFFICE 2,581,444

DIRECTION FINDER

Avery Groat Richardson, Boonton, N. J., and Frank O. Chesus, Bayport, N. Y., assignors, by mesne assignments, to Federal Telephone and Radio Corporation, Clifton, N. J., a corporation of Delaware Application September 28, 1949, Serial No. 118,222

15 Claims. (Cl. 343—124)

This invention relates to direction finder antenna systems and more particularly to antenna-goniometer combinations.

In a prior Patent No. 2,457,127, assigned to Federal Telephone and Radio Corporation, there is described and claimed a direction finder, goniometer arrangement particularly useful for the higher frequency ranges. The bearings obtained are bi-directional and a manual operation is required to secure sense of direction by connection of additional circuits. In said patent system, however, no provisions are shown for providing automatic sensing indication to avoid direction finding ambiguities.

It is an object of our invention to provide a direction finding antenna system with such connections and disposition of parts as to provide directly for obtaining a uni-directional bearing or non-ambiguous radiation pattern.

It is a further object of our invention to provide a simple rugged unitary antenna and goniometer assembly for use in radio direction finding or directional radiation systems.

In its broad aspects our invention contemplates the provision of a plurality of generators or loads, such as balanced antennas, coupled to a goniometer, the coupling means being arranged to supply energy to the stator of the goniometer at a potential above ground so that a combination of capacitive and inductive coupling to the goniometer rotor results in a pattern which is approximately cardioid shape. By inductive coupling the difference in voltage of the spaced antennas representing the directive pattern is induced into the goniometer rotor while by the capacitive coupling an omnidirectional sensing voltage is induced therein. The rotor and stator are dimensioned and positioned in such proportion as to provide the desired cardioidal shaped output pattern.

According to a feature of our invention we provide a goniometer of the type described in the aforesaid patent and coupled antennas acting as voltage generators or loads to it at spaced points as described herein. The generators are preferably balanced, dipole antennas, for example, and are so coupled with balanced-to-unbalanced transformers that one side of the unbalanced secondaries thereof are coupled to a common reference potential, ground for example, and the other sides of the secondaries are coupled to spaced points on the goniometer stator, there being sufficient capacitive coupling between the goniometer stator and the rotor to provide sensing antenna effect.

According to a further feature of our invention the antenna assembly constitutes a shielded container housing the goniometer and operating parts thereof, the antennas being symmetrically spaced about said container and rigidly mounted thereon by means of coaxial conductors which serve also as balanced-to-unbalanced coupling means between the antennas and the goniometer.

The above mentioned and other features and objects of our invention will become apparent and the invention itself will be best understood by reference to the following description of an embodiment thereof taken in conjunction with the accompanying drawings, wherein:

Fig. 1 is a perspective view of the antenna assembly;

Fig. 2 is a view partly in section illustrating the construction of the antenna goniometer assembly; and Fig. 3 is an equivalent circuit diagram of the antenna goniometer assembly.

Turning to the figures four dipole antennas are shown at 1, 2; 3, 4; 5, 6 and 7, 8 mounted on a central shielding housing 9 by means of separate coaxial line sections 10, 11, 12, 13, 14, 15, 16, 17, respectively. An output coaxial line 18 is connected to the lower end of housing 9, and may, in some cases, serve as the antenna mast for the assembly. A protective covering of insulating material may be provided about the antenna coupling parts, and supported by rings 19, 20, if desired, to keep moisture and the like away from the adjacent ends of the dipole and the coupling lines.

Turning now to Fig. 2, in which a fragmentary sectional view is shown, it will be seen that the goniometer itself comprises a fixed stator ring 21 and a rotor ring 22. Each of the coaxial line sections 10—17 is similar in construction to those shown at 10, 11 and 16, 17 in Fig. 2. An inner conductor 23 of coaxial line 10 is connected at one end to ring 21 at a point 24, the other end being serially connected to the inner conductor 25 and coaxial line 11, the far end of which is connected to the inner surface of shield 9. Similarly, inner conductor 26 of line 16 is connected to ring 21 at point 27 and the inner conductor 28 of line 17 is connected to the common potential ground at the inner surface of shield 9. The inner conductors of the others coaxial coupling lines are similarly connected to symmetrically spaced points on stator ring 21 and to the common ground potential.

From diametrically opposed points 29, 30 on rotor ring 22 are brought two leads 31, 32 which are connected to the inner and outer conductors 33, 34 respectively of coaxial lead-out line 35. This operation into an unbalanced coaxial line increases the capacity coupling to a useful degree. This is different from the balanced connection of the previous patent. These leads are coupled through rotary condenser coupling elements 36, 37 to the coaxial leads of line 18. A motor 38 serves to drive rotor 22 continuously so that the coupling between rotor 22 and the antennas through the stator 21 is continuously varied. A reference generator 39 is likewise driven by motor 38 to provide a reference voltage for use in the direction finder equipment to be used with this system. Power leads 40 and the output generator leads 41 may be conducted through the interior of the shield 9 by means of a shield line 42.

The operation of the goniometer shown herein is described in detail in the aforementioned U. S. Patent No. 2,457,127 and so will not be gone into herein. It should be noted however that each of the pairs of coaxial supporting and coupling lines serves as a balanced-to-unbalanced coupling between the balanced dipole antenna loads and the unbalanced goniometer construction. Thus the stator ring 21 is maintained at a potential above ground dependent upon the ratio of the unbalanced secondary impedance to the stator ring impedance. The stator 21 and rotor 22 have a capacitive coupling as well as the normal inductive coupling and this unbalanced capacitive voltage will at all times be present in the goniometer rotor. This serves to provide an omni-directional sensing voltage which in combination with the figure of eight directional voltage produces a cardioid shaped directive pattern which eliminates the directional ambiguity which could otherwise result from the directive pattern of the opposite dipole pairs. It will also be appreciated that the rigid coaxial structure provides an antenna which is relatively free from vibrations and thus stable in operation.

While in the illustrative embodiment we have shown the goniometer antenna assembly utilizing four dipoles, it will be readily understood that additional units may be provided as desired. For example, if eight antennas are used instead of four the so called octantal error will be reduced. By adding additional units these directive errors can be still further reduced. However, while a four-element array has been found very satisfactory in actual operation, we do not wish to limit the system to this number.

It will likewise be appreciated that while we have illustrated only a single form of goniometer structure any of the various types illustrated in the patent above referred to may be readily used with this type of system. Other types of goniometer construction may likewise be provided if desired.

While we have described above the principles of our invention in connection with specific apparatus, it is to be clearly understood that this description is made only by way of example and not as a limitation on the scope of our invention.

We claim:

1. A directive antenna system comprising a plurality of antennas, a goniometer having a stator and a rotor, means for maintaining said goniometer at a given potential above ground, and means coupling said antennas to said stator member and to ground to effect both capacitive and inductive coupling between said stator and said rotor to provide a directional response pattern of cardioidal shape.

2. A directive antenna system comprising a plurality of antennas, a goniometer having a stator and a rotor mounted to provide a given capacitive and inductive coupling therebetween, and means for coupling said antennas between said stator and ground to maintain said stator at a potential above ground, whereby a directive indicative voltage is induced in said rotor by said inductive coupling and an omni-directional voltage by said capacitive coupling, the dimensions and spacing of said goniometer stator and rotor being proportioned to provide a substantially cardioidal directive indication.

3. A system comprising a goniometer including first and second annular members, positioned in coupled relationship to each other, a plurality of balanced loads mounted about said goniometer, balanced-to-unbalanced coupling means for each of said loads for coupling similar points of each of said loads to a source of common reference potential and other similar points of each of said loads to respective points on said first annular member, and means for effectively rotating said first and second members relative to each other.

4. A directive antenna system comprising a goniometer including first and second annular members, positioned coaxially adjacent each other and a pair of leads coupled to substantially diametrically opposed points on said second member, a plurality of balanced antennas mounted about said goniometer, balanced-to-unbalanced coupling means for each of said antennas for applying voltage from each of said antennas between a source of common reference potential and respective spaced points on said first annular member, and means for effectively rotating said first and second members relative to each other.

5. An antenna system according to claim 4, wherein said antennas are dipole antennas.

6. An antenna system according to claim 5, wherein said balanced-to-unbalanced coupling means each comprise, first and second coaxial line sections having inner and outer conductors, the outer conductors of each section being directly connected to respective dipole arms, the inner conductor of the first section being connected at one end to said source of common potential and at its other end to the inner conductor of said second line section, said inner conductor of said second line section being connected to its respective point on said first annular member.

7. An antenna system according to claim 6, wherein said source of common potential comprises a grounded metal housing mounted about said goniometer.

8. An antenna system according to claim 7, further comprising a motor in said housing coupled to said second annular member for rotating this member.

9. An antenna system according to claim 8, further comprising a pair of fixed lead lines, and rotary coupling means mounted in said housing for coupling said pair of leads of said second member to said pair of fixed leads.

10. An antenna system according to claim 9 further comprising a reference voltage generator mounted in said housing and means for coupling said reference voltage generator to said motor.

11. An antenna system according to claim 10 further comprising power leads for said motor, and output leads for said reference voltage generator within said housing, and means for shielding said leads from the goniometer elements.

12. An antenna system according to claim 4, further comprising a pair of fixed leads, and a rotary coupling means for coupling said pair of fixed leads to said pair of leads of said second member.

13. An antenna system according to claim 4, wherein the means coupling said antenna to said first member is arranged to couple the antennas to symmetrically spaced points on said first member.

14. An antenna system according to claim 13, wherein the number of said antennas is four.

15. A direction finder antenna system comprising, a supporting housing for a goniometer and goniometer control means, a plurality of dipole antennas symmetrically arranged around said housing and a plurality of supporting and coupling means fixed to said housing and to said antennas for supporting said antennas and means coupling said antennas symmetrically to said goniometer, said goniometer comprising a first annular member mounted in said housing, a second annular member mounted in said housing coaxially of said first member and inductively and capacitively coupled to said first member, and said coupling means being connected as to couple energy from each dipole antenna to symmetrical points on said first annular member, whereby the energy induced in said second annular member contains components of directive energy and sensing energy.

AVERY GROAT RICHARDSON.
FRANK O. CHESUS.

REFERENCES CITED

The following references are of record in the file of this patent:

UNITED STATES PATENTS

| Number | Name | Date |
|---|---|---|
| 2,192,321 | Meier | Mar. 5, 1940 |
| 2,434,977 | Worrall | Jan. 27, 1948 |
| 2,457,127 | Chesus et al. | Dec. 28, 1948 |
| 2,468,028 | Browning | Apr. 26, 1949 |